United States Patent
Krishnaswamy et al.

(10) Patent No.: US 9,338,726 B2
(45) Date of Patent: May 10, 2016

(54) COOPERATIVE DATA MULES

(71) Applicant: QUALCOMM Incorporated, San Diego, CA (US)

(72) Inventors: Dilip Krishnaswamy, San Diego, CA (US); Soumya Das, San Diego, CA (US); Samir Salib Soliman, Poway, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 13/652,374

(22) Filed: Oct. 15, 2012

(65) Prior Publication Data
US 2014/0105083 A1   Apr. 17, 2014

(51) Int. Cl.
*H04W 40/22*  (2009.01)
*H04W 40/10*  (2009.01)
*H04W 52/02*  (2009.01)

(52) U.S. Cl.
CPC .............. *H04W 40/22* (2013.01); *H04W 40/10* (2013.01); *H04W 52/0261* (2013.01); *Y02B 60/50* (2013.01)

(58) Field of Classification Search
CPC ..... H04W 84/18; H04W 8/005; H04W 84/12; H04W 24/02; H04W 88/06; H04W 40/08; H04W 52/46; H04W 52/343; H04W 28/18; H04W 52/24
USPC .................. 370/252, 230, 329, 235, 338, 315
See application file for complete search history.

(56) References Cited

U.S. PATENT DOCUMENTS

| | | | |
|---|---|---|---|
| 8,155,102 B1 | 4/2012 | Hakola et al. | |
| 2003/0087654 A1* | 5/2003 | Wheeler ........... | H04W 56/0075 455/502 |
| 2004/0242154 A1 | 12/2004 | Takeda et al. | |
| 2008/0137585 A1* | 6/2008 | Loyola et al. ................. | 370/315 |
| 2009/0318124 A1 | 12/2009 | Haughn | |
| 2011/0051642 A1 | 3/2011 | Krishnaswamy | |
| 2011/0300852 A1 | 12/2011 | Krishnaswamy et al. | |
| 2012/0020260 A1 | 1/2012 | Chen et al. | |
| 2012/0120819 A1* | 5/2012 | Regev ........................... | 370/252 |
| 2012/0140651 A1 | 6/2012 | Nicoara et al. | |

(Continued)

OTHER PUBLICATIONS

Bote et al., "Data Gathering in Ultra Wide Band based Wireless Sensor Networks using a Mobile Node", IEEE Fourth International Conference on Broadband Communications, Networks and Systems BROADNETS, pp. 346-355, Sep. 2007.

(Continued)

*Primary Examiner* — Un C Cho
*Assistant Examiner* — Oussama Roudani
(74) *Attorney, Agent, or Firm* — Jia J. Wu

(57) ABSTRACT

A method, an apparatus, and a computer program product for wireless communication are provided. The apparatus provides or enables dynamic cooperative wireless data delivery service based on dynamic proximate locations of mobile nodes in wireless networks. A source wireless terminal may offload data for delayed transmission by a neighboring wireless terminal. The source may attempt delayed data transmission via any cooperating neighboring node (mule), whether mobile or stationary. A utility function may be used to compare costs of communicating via direct links or through opportunistically available links provided by mules. The mule may advertise availability of indirect data delivery service including probable latency time associated with the indirect delivery service.

75 Claims, 11 Drawing Sheets

(56) References Cited

U.S. PATENT DOCUMENTS

2012/0196528 A1* 8/2012 Kazmi et al. ............... 455/9
2013/0083722 A1* 4/2013 Bhargava et al. ............ 370/315

OTHER PUBLICATIONS

Sugihara, et al., "Path Planning of Data Mules in Sensor Networks," ACM Transactions on Sensor Networks, Aug. 2011, vol. 8, Issue 1.
Anastasi G., et al., "Energy conservation in wireless sensor networks: A survey", Ad Hoc Networks, Elsevier,.Amsterdam, NL, vol. 7, No. 3, May 1, 2009, pp. 537-568, XP026185309, ISSN: 1570-8705, DOI: 10.1016/J.ADHOC.2008.06.003.
Bennis M., et al., "Efficient Resource Allocation and Paving the Way Towards Highly Efficient IMT-Advanced Systems", Wireless Personal Communications, Kluwer Academic Publishers, DO, vol. 45, No. 4, Feb. 27, 2008, pp. 465-478, XP019617273, ISSN: 1572-834X, the whole document.
International Search Report and Written Opinion—PCT/US2013/065083—ISA/EPO—Feb. 18, 2014.
Jamal F., et al., "Relay selection approaches for wireless cooperative networks", Wireless and Mobile Computing, Networking and Communications (WIMOB), 2010 IEEE 6th International Conference on, IEEE, Piscataway, NJ, USA, Oct. 11, 2010, pp. 661-668. XP031807775, ISBN: 978-1-4244-7743-2, the whole document.
Khabbaz M.J., et al., "Disruption-Tolerant Networking: A Comprehensive Survey on Recent Developments and Persisting Challenges", IEEE Communications Surveys, IEEE New York, NY, US, vol. 14, No. 2, Apr. 1, 2012, pp. 607-640, XP011443397, ISSN: 1553-877X, DOI: 10.1109/SURV.2011.041911.00093 sections II, V.
Rais R.N.B., et al., "Message delivery in heterogeneous networks prone to episodic connectivity", Wireless Networks, The Journal of Mobile Communication, Computation and Information, Kluwer Academic Publishers, DO, vol. 17, No. 8, Aug. 17, 2011, pp. 1775-1794, XP019962167, ISSN: 1572-8196, DOI: 10.1007/S11276-011-0377-0, sections 3.1 to 3.4.
Lindgren A. et al., "Probabilistic Routing Protocol for Intermittently Connected Networks draft -irtf-dtnrg-prophet-10", Lulea University of Technology, DTN Research Group, May 22, 2012, pp. 1-122.
Kumar A.K., et al., "Energy-Efficient Mobile Data Collection in Wireless Sensor Networks with Delay Reduction using Wireless Communication," Second International Conference on Communication Systems and Networks (COMSNETS), IEEE, 2010, pp. 1-10.
Lee K., et al., "Mobile Data Offloading: How Much Can WiFi Deliver?," IEEE/ACM Transactions on Networking, IEEE, 2010, 12 pages.

* cited by examiner

COOPERATIVE DATA MULES

BACKGROUND

1. Field

The present disclosure relates generally to communication systems, and more particularly, to dynamic cooperative wireless data delivery using proximate mobile nodes.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus provides or enables dynamic cooperative wireless data delivery service based on dynamic proximate locations of mobile nodes in wireless networks. A served wireless terminal (source) may offload data for delayed transmission by a neighboring wireless terminal. The source may attempt delayed data transmission via any cooperating neighboring node (mule), whether mobile or stationary. A utility function may be used to compare costs of communicating via direct links or through opportunistically available links provided by mules. The source may wait to communicate delay tolerant data through a mule in order to optimize energy of the source device, obtain improved network connectivity through the mule, reduce network data load and signaling load by piggybacking on an existing data connection of the mule, particularly when signaling load is high but traffic load has headroom. In some embodiments, a mule may wait to communicate via a femtocell, a picocell rather than through a macrocell.

In an aspect of the disclosure, a method of wireless communication comprises receiving information from a user equipment (UE) advertising availability of an indirect data delivery service provided by the UE, determining a probable latency time associated with the indirect delivery service, transmitting a data packet to the UE for delivery to a packet data network using the indirect delivery service when a characteristic of the indirect data delivery service satisfies one or more performance optimization criteria, and directly delivering the data packet to the packet data network when the characteristic of the indirect data delivery service does not satisfy the one or more performance optimization criteria.

In an aspect of the disclosure, the data packet is transmitted to the UE when the probable latency time allows a delivery deadline associated with the data packet to be satisfied. The probable latency time may be provided in the information advertising availability of the indirect data delivery service that is received from the UE. The probable latency time is based on an expected access by the UE of the packet data network. The probable latency time may be determined based on a statistical analysis of prior accesses by the UE of the packet data network.

In an aspect of the disclosure, the data packet may be transmitted to the UE when the UE indicates that one or more other packets are scheduled for transmission to the packet data network, the UE advertises an aggregation service that permits transmission of data packets from a plurality of transmitters through a single connection with the packet data network, and/or the probable latency time allows a delivery deadline associated with the data packet to be satisfied. The probable latency time may be provided in the information advertising availability of the indirect data delivery service that is received from the UE.

In an aspect of the disclosure, the data packet may is transmitted to the UE when the UE advertises access to the packet data network through a wireless network transmitter that operates at lower transmission power than the transmission power of a local wireless network transmitter, the UE advertises access to the packet data network through a wireless network channel that provides higher data throughput than a local wireless network transmitter, the UE advertises access to the packet data network through a wireless network transmitter that has established a higher quality channel to a wireless base station than a corresponding channel of a local wireless network transmitter, the data packet is transmitted to the UE when the UE advertises access to the packet data network through a radio access network (RAN) that is different from a locally available RAN, the UE advertises future access to the packet data network through a RAN that is different from a currently available RAN, and/or when the UE advertises access to the packet data network through a WiFi network.

In an aspect of the disclosure, the probable latency time associated with the indirect delivery service is calculated based on an expected connection between the UE and the WiFi network. The performance optimization criteria may comprise battery life, and the data packet may be transmitted to the UE for delivery to the packet data network using the indirect delivery service in order to prolong local battery power.

In an aspect of the disclosure, the performance optimization criteria comprise network loading criteria. The data packet may be transmitted to the UE for delivery to the packet data network at a time when network loading is expected to be lower than current network loading. The network loading may relate to wireless network loading. The network loading may relate to packet data network loading.

In an aspect of the disclosure, the information advertising availability of the indirect data delivery service may be provided by the UE through a peer-to-peer network. The peer-to-peer network may comprise a Bluetooth network. The data packet may comprise encrypted data. The data packet may be one of a plurality of data packets transmitted to the packet data network through a plurality of UEs.

In an aspect of the disclosure, a method of data communication comprises estimating a maximum period of time required for a first UE to deliver data to a wireless wide area network (WWAN), calculating a probability that the data can be delivered by the first UE within the maximum period of time, and advertising a data offload capability to a second UE in a peer-to-peer message that includes information quantifying the maximum period of time and the probability. The probability may be based on likelihood that a connection between the UE can be sustained or established within the maximum period of time.

In an aspect of the disclosure, the method comprises receiving the data from the second UE in response to the peer-to-peer message, and transmitting the data from the first UE before the maximum period of time has expired. The data may be transmitted from the first UE to a third UE in response to another peer-to-peer message advertising data offload capability of the third UE. The data may be transmitted from the first UE to the WWAN.

In an aspect of the disclosure, advertising the data offload capability to the second UE includes broadcasting the peer-to-peer message to a plurality of UEs. The step of receiving the data from the second UE includes receiving data from the plurality of UEs. At least one of the maximum period of time and the probability may be determined based on a statistical analysis of prior connections between the first UE and the WWAN.

In an aspect of the disclosure, one of the UEs is in motion and at least one of the maximum period of time and the probability is determined based on previous travels of the moving UE. The peer-to-peer message may be transmitted when the second UE has a superior connection to the WWAN. At least one of the maximum period of time and the probability may relate to an expected connection.

DETAILED DESCRIPTION

Figure 1:
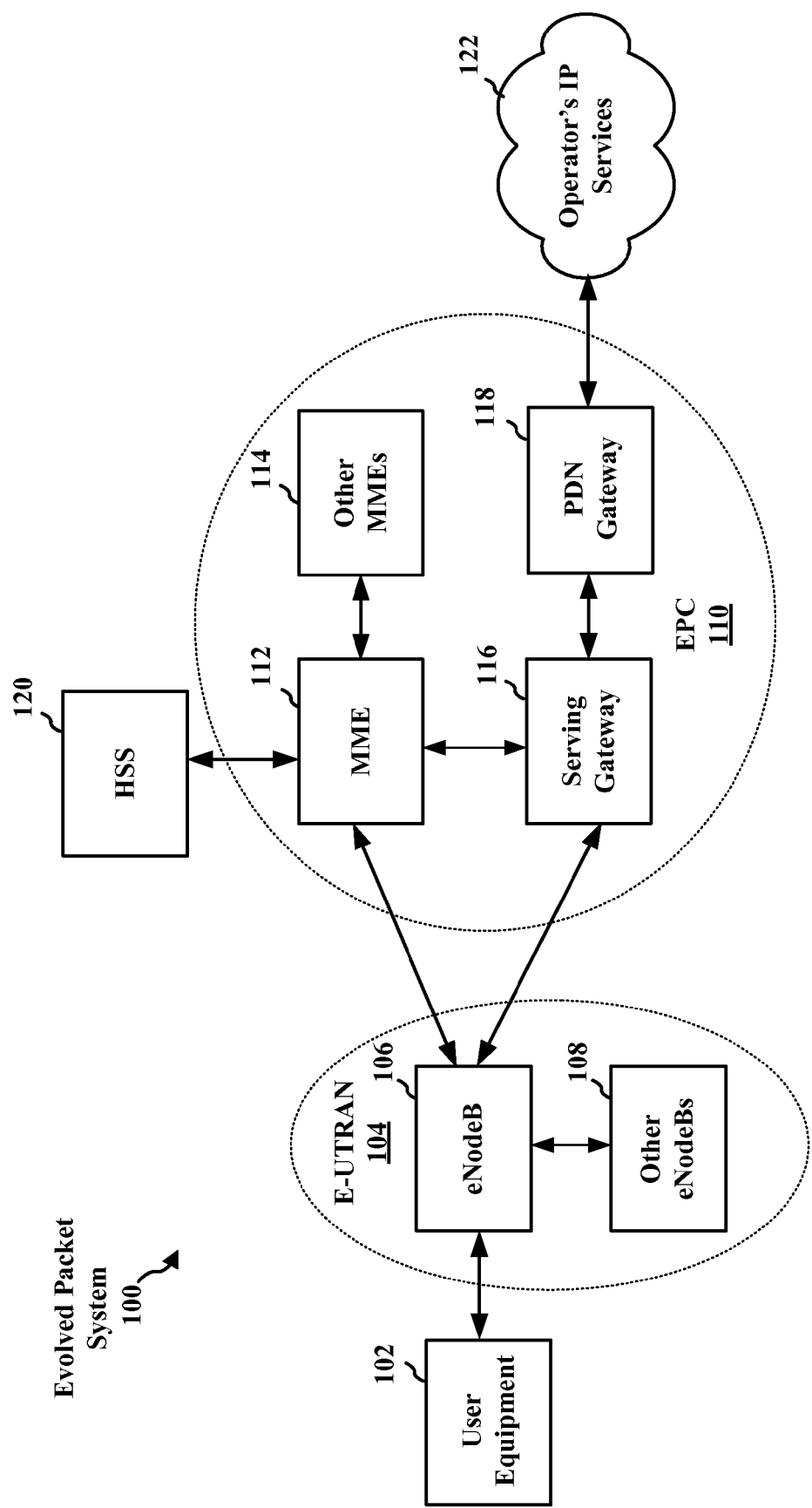
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UE 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
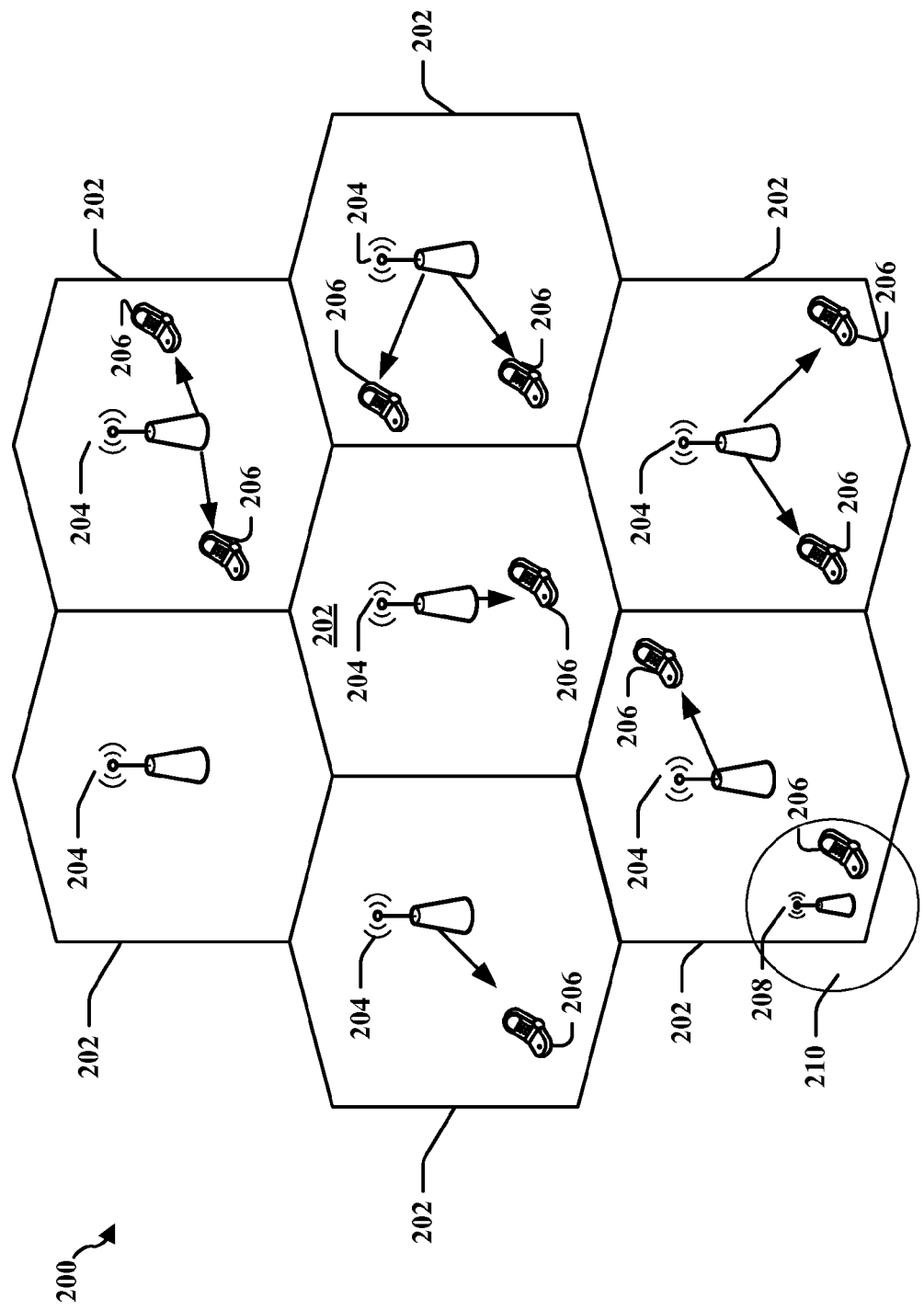
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
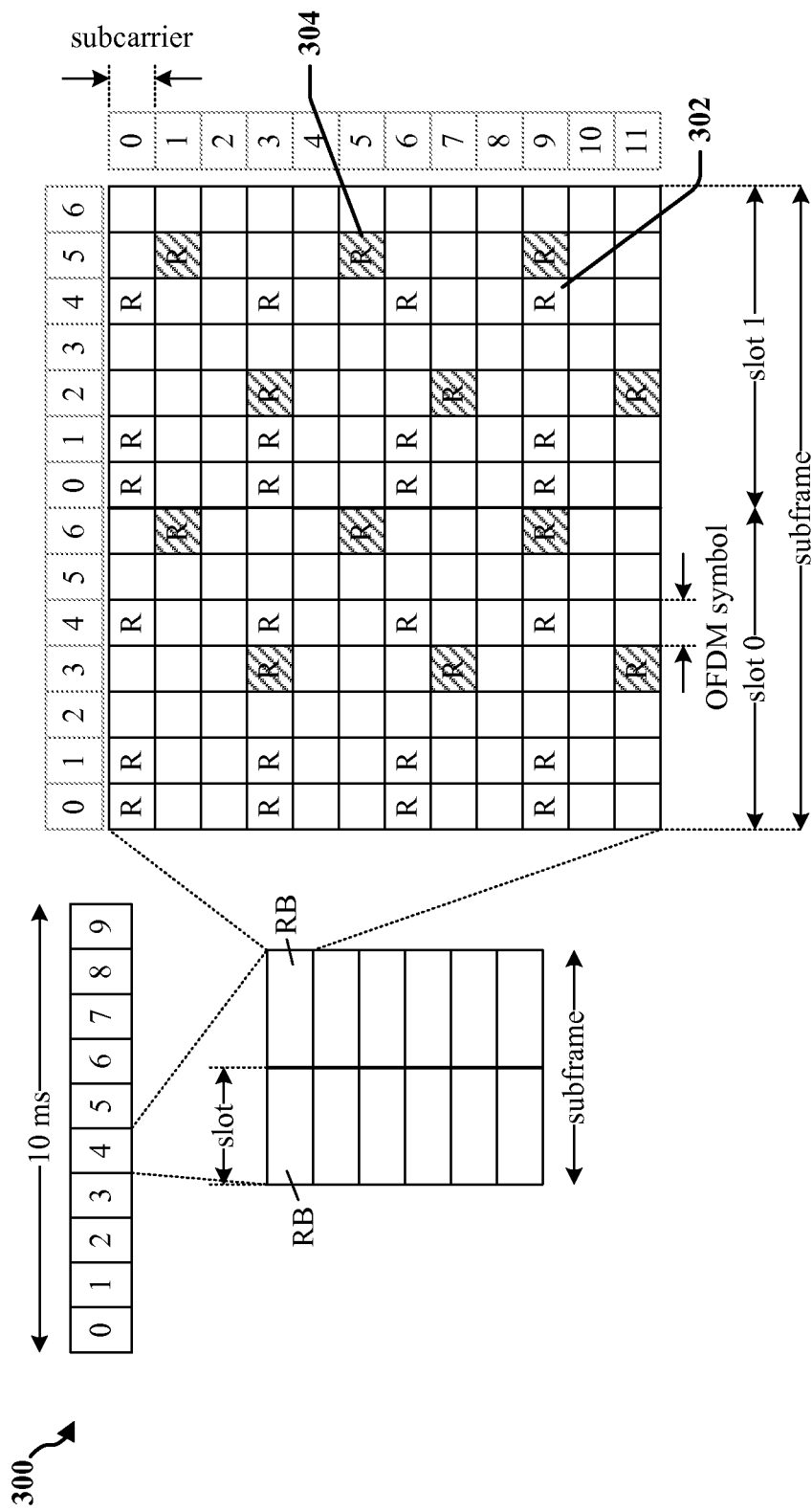
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
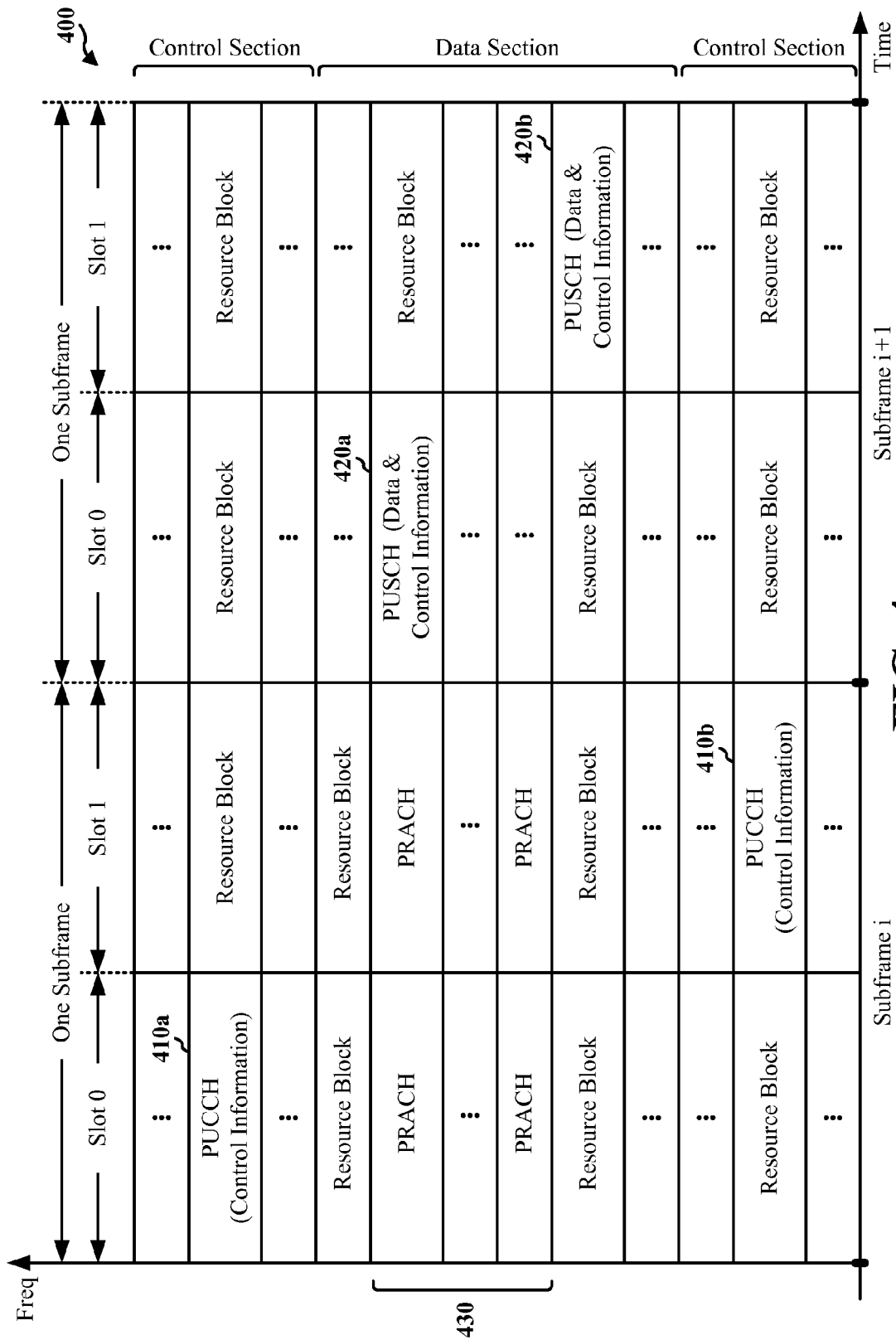
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
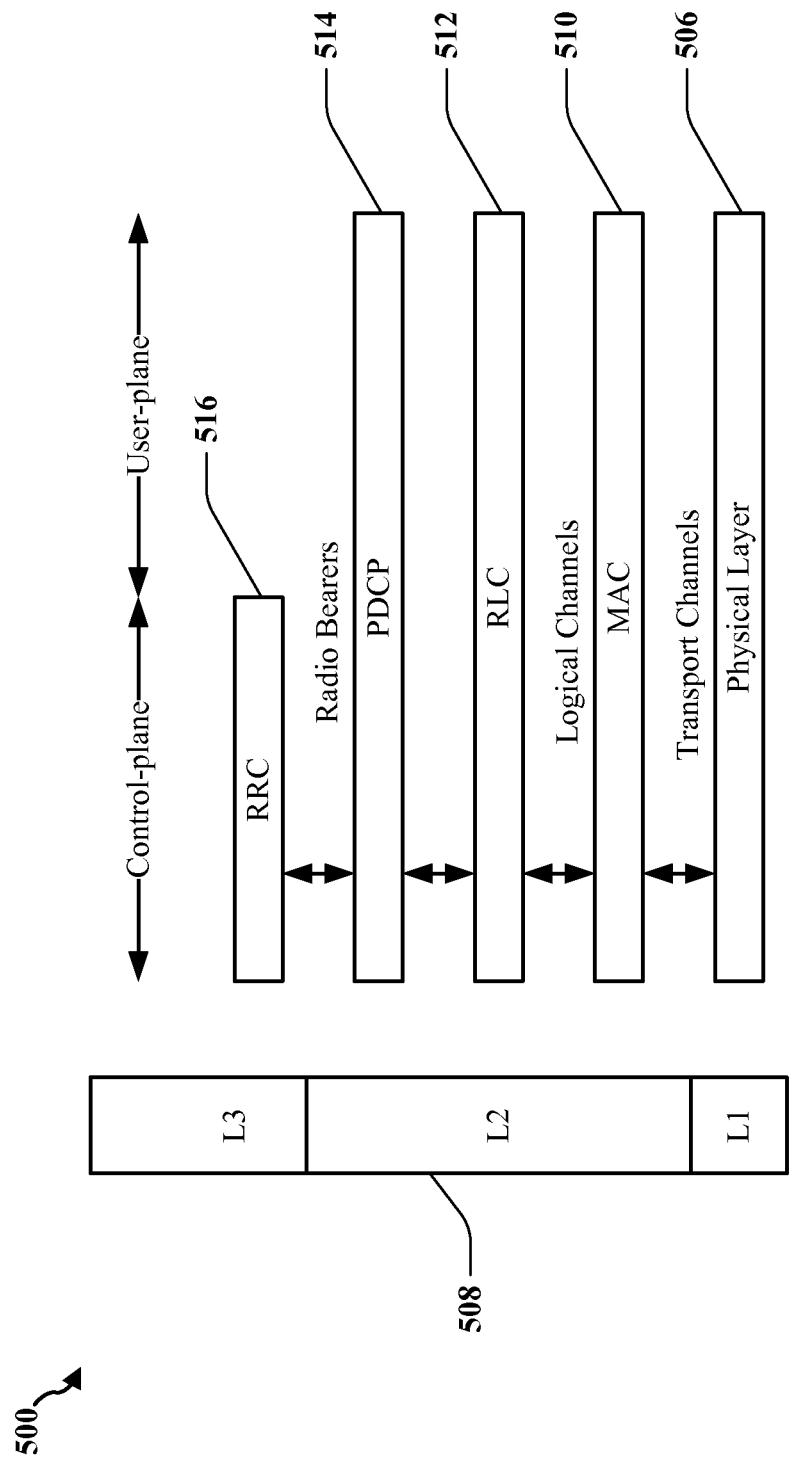
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
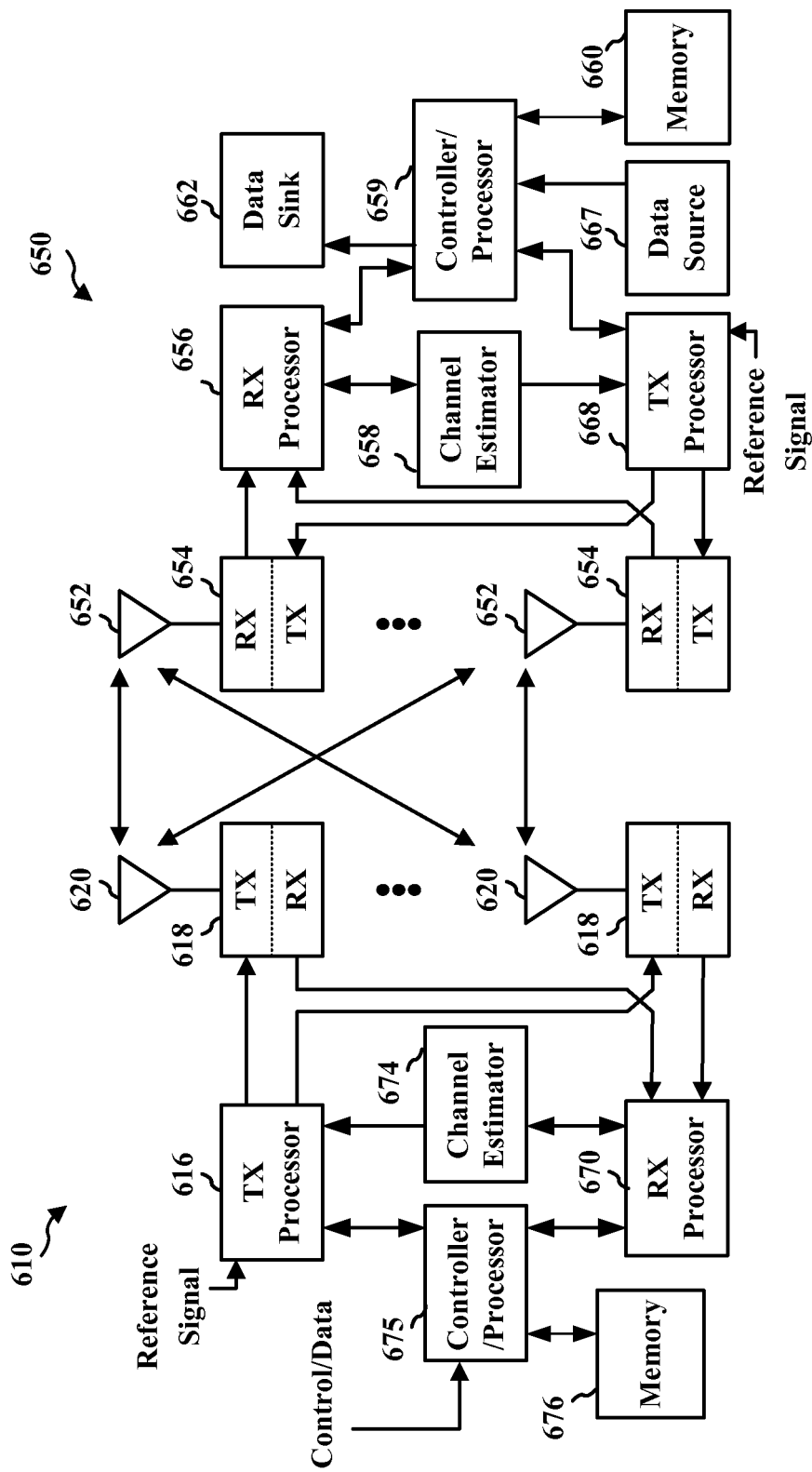
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
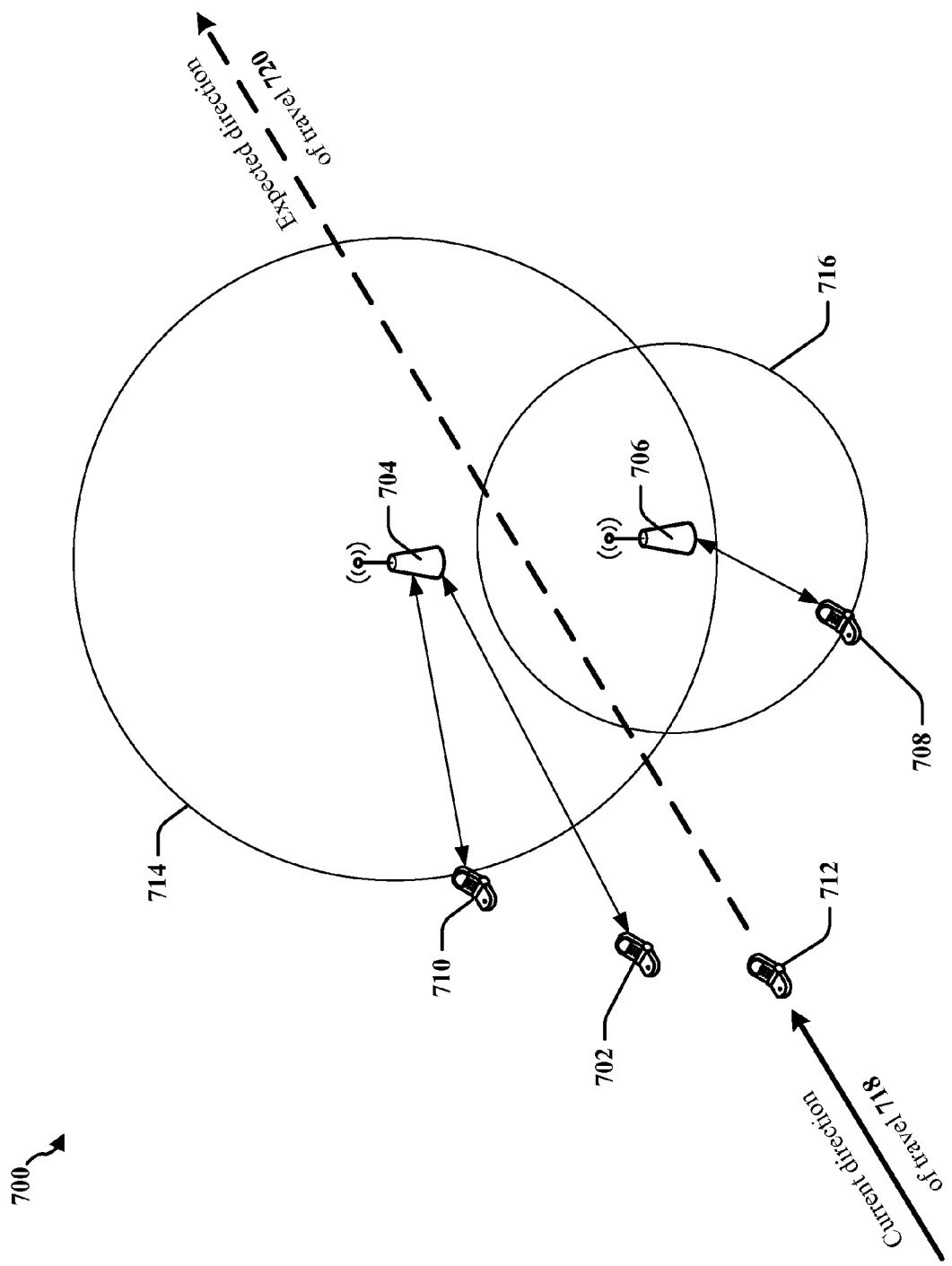
FIG. 7 is a simplified diagram illustrating certain aspects of cooperative data shipment using data offloading between equipment in a wireless network.

FIG. 7 is a simplified diagram 700 illustrating certain aspects of cooperative shipping of data using data offloading between equipment in a wireless network. In FIG. 7, UEs 702, 708, 710 and 712 operate in a geographical area which includes two or more base stations 704 and 706 that provide wireless communications in the geographical area. A base station may be a NodeB, an eNB, a WiFi hub, a repeater, or any wireless network access point. Base stations 704 and 706 may be provided managed and/or operated by the same network operator or by different network operators. Base stations 704 and 706 may communicate using the same or different radio access technologies (RATs), which may comprise one or more of LTE, W-CDMA, TD-SCDMA, GSM, E-UTRA, Wi-Fi, WiMAX, IEEE 802.20, Flash-OFDM, CDMA2000, UMB, IEEE 802.15 (ZigBee), Bluetooth, and so on.

In one example, base stations 704 and 706 may be eNBs configured to provide LTE service on behalf of a single network operator. In another example, base stations 704 and 706 may employ different RATs and may be operated by the same or a different operator. To facilitate description herein, an example is adopted whereby base station 704 comprises an eNB in an LTE RAN, and where UEs 702 and 710 have established connections with base station 704. Circle 714 is provided for illustrative purposes only and does not necessarily represent the range of base station 704. Moreover, the diagram of FIG. 7 is not drawn to scale and distances between elements shown in the diagram are selected for illustrative purposes only. For the purposes of this description, it will be assumed that UE 710 is physically closer to base station 704, or otherwise receiving a significantly stronger signal than UE 702. Accordingly, UE 702 may be operating at increased transmission power relative to UE 710, thereby limiting battery life of UE 702. In the example, base station 706 may have established a connection with UE 708 using WiFi that services a limited area defined by the range 716 of base station 706, and beyond the range of UE 702. UE 708 may additionally be connected to base station 704 or to another base station (not shown) in a different radio access network. UE 712 is in motion travelling in a direction 718. UE 712 may be connected to base station 704 or another base station (not shown). In some instances, UEs 702, 708, 710 and 712 may be operating in different RANs but located in close proximity, and two or more of UEs 702, 708, 710 and 712 may be within 10-20 feet of one another.

Delayed offload may offer significant benefits for delay-tolerant applications that have some delay budget. In the example described herein, UE 702 may be assumed to have a significant quantity of data to transmit to a network server, such as an Internet server. However, UE 702 may be experiencing low availability of bandwidth in the RAN associated with base station 704, and/or UE 702 may wish to conserve battery power. In some embodiments, one or more of UEs 708, 710 and 712 may be used as data mules that allow UE 702 to offload data through a low-power P2P connection. UEs 702, 708, 710, and 712 are typically located proximate to one another, such that low power peer-to-peer communications is available between UEs 702, 708, 710, and 712. Each of UEs 702, 708, 710, and 712 can operate as a serving UE that receives and forwards offloaded data. Each of UEs 702, 708, 710, and 712 can also be a served UE that offloads data to a serving UE. In some embodiments, one or more UEs 702, 708, 710, and 712 can simultaneously be a server UE and a serving UE. For example, UE 712 may offload data to UE 702 for immediate delivery, while receiving delay-tolerant data from UE 702 for later delivery over an improved communication link, or at lower cost.

The decision to transfer data through data offloading may be based on a variety of criteria in addition to conventional quality of service (QoS) characteristics. The criteria may include average data rate, maximum data rate, latency, and/or a delay budget associated with a specific payload. The delay budget may specify a maximum delay that can be tolerated for the payload, as measured from a current time. A UE 702, 708, 710, or 712 that advertises a high likelihood of delivery within the delay budget may be considered for data offload. The size of the payload, or a reasonable estimate of the payload size may be considered and, in at least some embodiments, a UE 702, 708, 710, or 712 may qualify an advertised estimated delivery time as applying to payloads that do not exceed a maximum size. A transfer window may be determined such that transfer window is shorter than the budgeted delay.

A UE 702 may consider its present state when considering whether to offload data. For example, remaining battery life and current cost of communication over current link may be considered. In some embodiments, an operator may provide incentives for using data offloading services, particularly during peak traffic periods. Thus, charges for transmitting the payload may be calculated at off-peak rates when a payload tagged by UE 702 as delay-tolerant is transferred through data offload, even if the UE 702 first transmits the payload (to a data mule) during peak traffic periods. The network may be configured to identify the ownership of a payload in order to apply charges, credits and discounts appropriately. For example, a serving UE 712 or served UE 702 may notify the network of the occurrence of data offload and/or may transmit a header that identifies the payload in transit, such that the served UE 702 is charged for transmission by the serving UE 712 and the serving UE 712 can receive a credit.

The operator may provide pricing incentives to ameliorate signaling load and data load on a WWAN. Accordingly, UE 702, 708, 710, or 712 may advertise an existing connection through which data from other UEs 702, 708, 710, or 712 may transmitted in an aggregated payload. A base station 704 or 706 may provide information to UE 702, 708, 710, or 712 identifying the presence of one or more mules in the RAN.

In determining whether to use data offloading, UE 702, 708, 710, or 712 may consider current or expected conditions in one or more networks. For example, the UE 702, 708, 710, or 712 may compare average link quality over short term and long term windows, the availability or expected availability of other serving UE 702, 708, 710, or 712, repeaters, femtocells and/or picocells. A UE 702, 708, 710, or 712 seeking to use data offload may be seeking a better communication link, with better rates, lower energy, lower loading and may select between options based on a mobility pattern developed for a UE 702, 708, 710, or 712 and/or its associated user.

Data mules can be used to transfer information wirelessly across a geographic area between stationary or near-stationary UE 702 to moving UE 712. Note that both UE 702 and UE 712 may be moving and the decision to offload data may be made after comparing the advertised delivery capabilities of served UE 702 and a serving UE 708, 710, or 712. In some instances, a UE-in-motion 712 may be moving away from network coverage and may offload to one or more of UEs 702, 708, and 710. In the example described herein, UE-in-motion 712 is moving toward superior network coverage and may serve as data mule for UE 702. UE 712 may transfer information received from UE 702 to a network upon connecting to base station 704 or 706, or to another network access point. In one application, data mules may be used in a sensor network to collect and deliver information from sensors that otherwise cannot directly access a network. The mule traverses the sensor network, collecting or delivering data. The mule may periodically "dump" collected data directly to a data network, and/or to another node with backhaul connectivity to the data network. Mules may be provided for the purpose of collecting and delivering data and may attempt to find the most optimal path to cover all sensors and, after dumping data, may resume its traversal of the sensor network. Multiple mules can be used simultaneously in the same network.

In certain embodiments of the invention, one or more of UEs 702, 708, 710, and 712 can be adapted to operate as data mules in a wireless network and/or to offload data to another UE 702, 708, 710, or 712 operating as a data mule. Data offload may be performed in a wireless network to deliver data to a packet data network more quickly, more power-efficiently, to relieve wireless network congestion, and/or to take advantage of pricing discounts offered by an operator based on time and mode of data transfer. Data offload may be performed between UEs 702, 708, 710, and 712 using peer-to-peer (P2P) networking, WiFi, Bluetooth, or other connection between the UEs 702, 708, 710, and 712.

In certain embodiments, a serving UE 702, 708, 710, or 712 may advertise its ability to provide indirect delivery service using a common RAN, such as LTE, to identify its likely transmission latency. The serving UE 702, 708, 710, or 712 may alternatively or additionally advertise its capabilities related to provision of indirect delivery service through a local wireless or wired connection such as Bluetooth, WiFi, etc. For example, a serving UE 702, 708, 710, or 712 may advertise an expected delivery time and an estimated probability of meeting the delivery time over a short range, low power Bluetooth network.

In the example described in relation to FIG. 7, UE 712 may advertise an expected delivery window that is determined based on an expectation that UE 712 will be within range of base station 704 or 706 within a certain time. The expected delivery window may be based current direction of travel 718 of UE 712, expected or continued direction of travel 720, and/or on a history of prior connections between UE 712 and a WiFi network associated with base station 706 or history of prior connections of UE 712 to base station 704. The history of prior WiFi connections and/or the history of prior connection to base station 704 may identify a pattern of connections that can be correlated with a time of day or week, presence in a geographic area, and other factors associated with UE 712. The expected delivery time may be calculated to take into consideration the quality data channels currently available, or expected to be available on one or more RANs, as well as a current location, a time of day and a pattern of behavior of the user of serving UE 712. The expected delivery time may be provided for a particular quantity of data and may be based on bandwidth that is expected to be available, and/or the length of time that the UE 712 is expected to be connected to base station 704 or 706.

Serving UE 712 typically advertises a maximum delivery time for offloaded data to a data network. For example, UE 712 may estimate that it will be within range 714 of base station 704 within a first time period, and/or within range 716 of WiFi network provided by base station 706 within a second time period. The first and second time periods may be based on velocity of UE 712 and a consideration of recent changes of speed and direction of UE 712, time of day, nature of the geographic location, and so on. A probability of meeting the deadline for delivery advertised by UE 712 may be based on whether and how often the UE 712 has traveled on the same route, available battery power of UE 712 and other factors. In the example described herein, UE 712 may calculate the probability based on the expected availability of connections to multiple RANs (e.g. base stations 704 and 706). For example, UE 712 may advertise a high probability (e.g. 90% or more) when a history maintained by the UE 712 may indicate that, for a certain current location, and when UE 712 is traveling in its current direction 718, UE 712 has always previously been able to connect to at least one of base station 704 and 706, even if the UE 712 veers from the expected direction of travel 720. The latter example may be realized, for example, when the UE 712 is traveling from a rural location to an urban area.

Serving UE 712 may advertise a quality of available data channels on one or more RANs. Serving UE 712 may advertise current location, time of day and patterns of behavior of the user of the serving UE 712. The served UE 702 may use advertised data offload services to preserve battery power of the served UE, to obtain reduced pricing, and/or when access to a better quality data channel is available through the serving UE. In one example, incentives may be offered to reduce channel overhead by providing lower charging rates when data is transmitted through a serving UE 712 that has already established a channel for communicating with a packet data network. The incentives may include rebates to the serving UE 712.

Served UE 702 may consider data offload capabilities advertised by a plurality of UEs 708, 710, or 712 and may select one or more of UEs 708, 710, and 712 for offloading data. In the example, UE 710 may have a better connection to base station 704, or another base station in the operator network. UE 708 may be connected to a different base station 706 and may offer connection through a faster, less expensive and/or more reliable wireless network. Served UE 702 may select a serving UE 708, 710, and 712 as a data mule based on advertised delivery time and probability that the advertised delivery time will be met. In some embodiments, UE 702 may offload data to two or more UEs 708, 710, and/or 712 in order to improve the probability that the offloaded data is forwarded within a desired time period.

In some instances, UE 702 may elect to transmit the data directly to a base station 704 or 706, even when other UEs 708, 710, and 712 are advertising data offload capabilities. The UE 702, 708, 710, or 712 may determine viability of data offload based on its time budget. If significant time is available for data transfer to another UE 708, 710, or 712, served UE 702 may delay data offload in order to wait for the optimal link/load situation for transfer. For example, an optimal transfer may occur when communication cost falls below a certain desirable threshold, and transfer may occur at some future time when estimated communication cost for future transmission is lower. The delayed transfer can be measured in minutes, hours, or days. Typically, charging rates and network usage cycle over periods of time that can range from between 1 and 12 hours.

A served UE 702 may consider reliability of the advertising UE 708, 710, or 712. The serving UE 708, 710, or 712 may advertise a self-assessment of reliability that is based on past performance relative to advertised service levels. Reliability may be based on mobility patterns of the serving UE 708, 710, or 712, knowledge of link quality and/or load variations. Reliability may also be based on a prior history maintained by the served UE 702 that may indicate overall success of data offloads, in terms of timely delivery. The prior history may include histories associated with individual serving UEs 708, 710, or 712. UE 702 may deduce that untimely delivery has occurred, or that no delivery has occurred when it is notified of a dropped payload by a receiver. In some instances, a base station 704 or 706, a charging server, a packet data network gateway or other network entity may be informed of the occurrence of data offload and may report back to UE 702 if the payload is delivered on time, late, or if the payload is considered dropped. In some embodiments, the serving UE 708, 710, or 712 reports delivery information directly to served UE 702.

When a transfer window is closing UE 702 may determine to send the payload directly through any available WWAN link. A serving UE 708, 710, or 712 typically monitors offloaded data that it carries for one or more served UEs 702 and determines an optimal time and payload sequence for transmitting the offloaded data. UE 702 may decide to offload data to one or more of UEs 708, 710, and 712 if its ability to transfer is close to expiration due to possible loss of a P2P link with the one or more of the UEs 708, 710, and 712. The UE 702 may determine that it is better to offload data to one or more of UEs 708, 710, and 712 which has a better, but suboptimal link, but which offers an expectation of a future reduction in cost. UE 702 may offload data even though the link offered by the one or more UEs 708, 710, and 712 may not be currently established and the one or more UEs 708, 710, and 712 is currently connected to the WWAN by a link that is no better or even significantly inferior to the link established by UE 702 to the WWAN, when there exists an expectation that the serving one or more UEs 708, 710, and 712 will be connected to a superior link within the transfer window. The serving UE 708, 710, or 712 may transfer offloaded data payload over a less than optimal WWAN link if a transfer window for the payload is expiring.

In some embodiments, data offload decisions are taken based on remaining battery life of the served UE 702. Data may be offloaded if the remaining battery life of the served UE 702 is likely to be insufficient to complete direct WWAN transfer. The decision to offload data may be accelerated if the remaining battery life on served UE 702 is currently too low for direct WWAN transfer and is directly threatening the ability of UE 720 to complete a data offload. P2P communication is typically associated with lower energy cost.

In certain embodiments, a served UE 702 may enlist multiple UEs 708, 710, or 712 to serve as mules for transferring delay-tolerant data to a network destination. UE 702 may send different portions of the payload through different ones UEs 708, 710, and 712. UE 702 may selectively send certain payloads through two or more different UEs 708, 710, and 712 to improve likelihood of delivery within the transfer window. For example, UE 708 and 712 may advertise a 90% probability that the payload will be delivered on time and transmitting the data packet through both UE 708 and 702 improves reliability to 99%. Served UE 702 and/or serving UEs 708, 710, and/or 712 may query the network destination to verify that the payload has been delivered, to avoid duplicate delivery by multiple serving UEs 708, 710, and 712 and/or to recover from data loss if serving UE 708, 710, or 712 was unsuccessful.

In certain embodiments, a served UE 702 may be configured to transmit a data packet only once, through a single serving UE 708, 710, or 712, or through one or more UEs 708, 710, and/or 712 depending upon the nature of the payload. Upper layer protocols may be used to reassemble and/or reorder transmitted packets and to detect lost or dropped packets. In some embodiments, a network entity may be notified of the use of a mule or other device to offload data and may be configured to monitor the presence and operation of the mule. A mule or other device may confirm transmission of packets and/or its inability to transfer packets to the packet data network in a timely manner. Accordingly, the monitoring network entity may inform transmitters and receivers of probable packet loss. In some embodiments, the monitoring entity may maintain statistics and other information related to the performance of a serving UE 708, 710, or 712, and such information may inform future data offload decisions.

In certain embodiments, a payload may be offloaded from served UE 702 to a serving UE 712, which may later offload the payload to a different UE 708 or 710. In some embodiments, payloads are tagged, marked or otherwise marked to avoid creating a loop whereby the payload is returned to its original UE 702. While such loops may be self-limiting because of the transfer window associated with each payload, prevention of loops can improve energy consumption and available bandwidth on both WWAN and P2P networks. In some embodiments, an attempt or actual return of payload to UE 702 may be interpreted as a failed data offload, prompting the UE 702 to transmit the payload directly to the WWAN.

Typically, a UE 702 that is the source of the payload may encrypt portions of the payload. Accordingly, serving UEs 708, 710 and 712 may have limited access to the content of the payload, and access may be limited to certain headers, control and scheduling information related to data offload. Encryption is typically established by direct connection between served UE 702 and the WWAN. In some embodiments, a served UE 702 can scramble or otherwise split a payload for transmission over multiple mules and/or direct connection, thereby enhancing data communication security.

Serving UE 712 may aggregate data from multiple served UE 702, 708, and 710 and transmit the data through a single connection to the packet data network, thereby minimizing signaling overhead and reducing the number of data connections that must be maintained by a packet data network and wireless infrastructure supporting the packet data network. For example, a plurality of attendees at a business, sporting or other forum may wish to access a network resource of interest to the forum attendees. Serving UE 712 may establish a connection with the network resource in order to provide multiple served UE 702, 708, and 710 access to the network resource.

Data offload may enable a network operator to better manage network traffic and avoid congestion by providing a mechanism by which served UE 702, 708, 710 and 712 can delay transmission of non-time critical data until a later time when the network is likely to be less congested. The operator may incentivize data offload by providing off-peak charging to served UE 702, 708, and 710 that initiate transmission of data during peak times through serving UE 702, rather than directly through the operator's wireless network.

In one example, users of UEs 702, 708, 710, and 712 may be in Wi-Fi coverage 63 percent of the time during the day, on average. The UEs 702, 708, 710, and 712 may remain in a Wi-Fi zone for two hours on average. Based on usage patterns, 65 percent of traffic may be offloaded to Wi-Fi under typical usage conditions using on-the-spot offload when Wi-Fi on demand is available. In this example, greater offload performance can be achieved if offloaded data can be delayed. Candidates for data offload include transmission of video, photographs, applications and other multimedia data for synchronization with a specific server, or a network cloud server.

Offload of data can be delayed in order to use improved bandwidths, and delaying delivery of offloaded data can preserve energy. A Wi-Fi network may provide connections of 2 Mbps on average, but 2.76 Mbps at night, with 1.26 Mbps during the day. Wi-Fi is faster than some 3G technologies, and offload may provide a 55 percent improvement in battery life.

Data offload can save energy at the served UE 702, 708, 710, or 712 because the data offload communication typically requires lower energy than the energy required to communicate with a base station 704 or 706. Data offload may be used when a served UE 702, 708, 710, or 712 does not have access to, or the ability to connect to, a WWAN which is accessible to serving UE 702, 708, 710, or 712. Inability to access a WWAN may be caused by a lack of subscription or radio compatibility with the WWAN. Delivery of offloaded data by the serving UE 702, 708, 710, and 712 may wait for lower network load on the WWAN. Moreover, a UE 702, 708, 710, or 712 that is already connected to a WWAN may carry data on behalf of a served UE 702, 708, 710, or 712 without additional control plane signaling, which can provided benefits to a loaded network.

Certain embodiments employ P2P data links for offloading data between UEs 702, 708, 710, and 712. When UE 702 has data for transmission that is delay tolerant, UE 702 may wait for a low energy P2P link with another UE 708, 710, and 712 to offload data. In one example, LTE P2P messaging may be used for data offloading and certain uplink slots may be allocated for communicating P2P messages. A peer UE 702, 708, 710, or 712 with good links to the network may advertise itself as a network relay to the other peer UEs 702, 708, 710, and 712 on a peer and/or proximity-discovery channel. In base stations 704 or 706 that comprise macro-cells with asymmetric connections, modulation and encoding schemes for peer UEs 702, 708, 710, and 712 connections may be coordinated within and between RANs. For example, a macro-cell may employ both SCFDMA and OFDMA and for Tx and Rx connections and, for P2P connections, peer UEs 702, 708, 710, and 712 may be configured to use one scheme for both transmit and receive, or to use both schemes asymmetrically as used in the RAN.

In certain embodiments, UEs 702, 708, 710, and 712 employ an algorithm based on a utility function that accounts for different factors with multiplicative, additive, and/or probabilistic terms. Typically, a higher utility value indicates increased benefit in offloading data. The utility value may be affected by a cost of communication, including device energy cost, signaling load, network load, and link quality. The utility value may be further affected by a rate of change of cost of communication, a time value associated with the remaining transfer window. The utility value also typically accounts for probability of link availability, which may be dependent on the remaining transfer window. Typically, the probability of link availability diminishes as the remaining transfer window diminishes.

At the commencement of the transfer window UE 702 may wait for potentially better connectivity options. The UE 702 may evaluate alternatives and, for example, if future options are not sufficiently promising, the payload can be transferred to the WWAN or to a less than optimal serving UE 708, 710, or 712 early in the transfer window. Should the UE 702 withhold transfer, the difference in utility of a currently available link and a future probable link is increased as the transfer window time reduces. Accordingly, the probability of using a currently available link is increased and/or the probability of using a future link may be reduced. The probabilities of using current and future links may be a function of expected link costs and/or rates of change of link costs. Typically, the cost associated with currently available links may be lowered, thereby increasing the probability that the currently available link may be used.

The utility function may compare differences in utility of different links in order to select the optimal link. The optimal link may be selected when the difference exceeds certain threshold, and the threshold may decrease as the transfer window is reduced. The utility function may compare differences in utility done based on both a diminishing probability for the links, and expected link cost, rate of change of link cost, and/or potential reductions in cost of a currently available link.

A served UE 702 may compare utility values across its available communication links. The UE 702 may compare cost of communication of possible opportunistic P2P links or local links with the cost of communication on a direct link to a WWAN. Even if a better link is available, served UE 702 may wait for improvements in the better link, where the improvements may be related to lower load, better quality, and/or lower energy. In one example, UE 702 may wait for UE 712 to be at its closest approach before offloading data.

As noted herein, the utility of transmitting over an available link increases as transfer window time reduces. The relationship between a decrease in utility and the remaining time may be configured to encourage usage of a best current link. For example, a current link that meets or exceeds certain predefined thresholds may be selected for immediate transfer, even if the link is likely to improve.

In certain embodiments, a utility function for a link at time t is based on an intrinsic utility at current time t and a time-value of the utility (T−t), where T denotes the time at which the transfer window closes. The time-value function can be adjusted and/or weighted for different links based on link type, reflecting the likelihood that some links have a better probability of improving than others. Time dependency can be a function of the ability of the link to get better, and the proximity to the closure of the transfer window.

In certain embodiments, a utility function may be expressed as:

$$U=P_1*P_2*F(C,C')/S,$$

where:
 $P_1$ is the probability of availability of a direct or P2P mule link,
 $P_2$ is the probability of delivery by the direct link or the mule
 F(t') is a function of current communication cost C(t) and rate of change of communication cost C'(t). In one example, the function F(t') may be F=C+λ*δt*C', where δt=(t'−t), and λ can be a fraction.
 S is a function of available time, including for example, sigmoid, whereby S decreases as available time decreases, thereby increasing U.
Available time may depend on delay tolerance of data and/or duration of availability of a P2P link with a cooperative data mule. Note that the availability of a P2P link is typically relevant when other factors are favorable.

In certain embodiments, a different utility function may be used where, for example, $$U=P_1*P_2*[F(C,C')+\alpha/S].$$

An overall cost function may be used that decreases as utility increases, thereby representing an inverse of utility. A payload may be transmitted on the best available link when OverallCost→0 or as OverallCost→ϵ where ϵ is a minimum cost threshold that triggers data transfer.

In some embodiments, serving UE 708, 710, or 712 may advertise both a utility conditioned on successful delivery, and the probability of delivery ($P_2$) to the served UE 702. UE 702 may then determine whether to deploy one or more of UEs 708, 710, and 712 as a mule as appropriate to maximize the probability of success.

In certain embodiments, data offload may employ proximity services and discovery features available in a wireless network. In an LTE network, for example, a network operator may enable device and service discovery under network control, providing continuous discovery service that employs optimized signaling and maintains power efficiency and privacy. Operators can offer discovery based on a proximal graph.

In certain embodiments, LTE-D2D discovery resources may be configured by the RAN, which may enable resources to be synchronized in time within the geography. One or more UEs may transmit discovery signals carrying discovery-related information within predefined or preconfigured discovery resources, and each UE may decode discovery-related information related to other UEs.

Certain embodiments communicate discovery-related information in control channels defined for the RAN. In an LTE network, discovery-related information may be communicated in PUSCH resource blocks. For example, in a 10 MHz FDD system, 44 PUSCH resource blocks may be used for discovery. Sub-frame allocation may be variable and controlled by an eNB. A discovery period can be defined, which may extend from seconds to minutes. In the 10 MHz FDD system example, a 20 second discovery period provides 64 subframes and the number of direct discovery resources (DRIDs) may be 44*64=2816 resource blocks available for discovery. It will be appreciated that subframe allocation may be variable and controlled by eNB In certain embodiments, DRID may be evaluated and selected upon power up. A UE may listen on the direct discovery resources. The UE may rank DRIDs according to received energy and pick a DRID based on one or more criteria. In some embodiments, DRIDs are selected randomly from among the lowest 5 percentile.

Certain embodiments provide a collision detection and resolution protocol that may be used to detect and resolve issues associated with the use of a same DRID by proximately located UEs. A UE may randomly select one out of every N discovery periods for listening and the UE may listen to detect collisions caused by other UEs in the vicinity.

Figure 8:
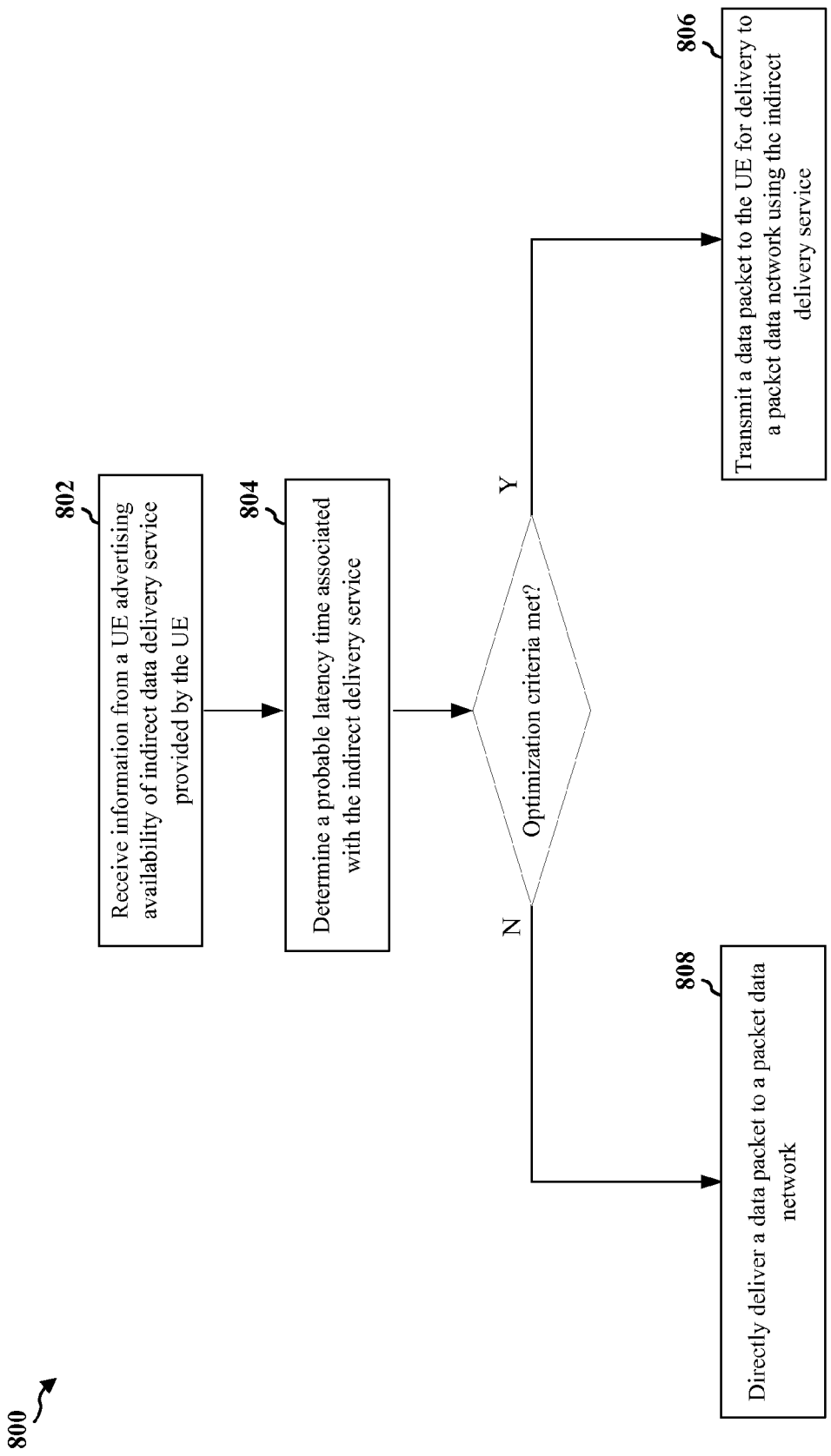
FIG. 8 is a flow chart of a method of wireless communication.

FIG. 8 is a flow chart 800 of a method of wireless communication. The method may be performed by a UE 702. At step 802, the UE 702 receives information from UE 708, 710, or 712 advertising availability of an indirect data delivery service provided by the UE 708, 710, or 712. The information advertising availability of the indirect data delivery service may be provided by the UE 708, 710, or 712 through a peer-to-peer network. The peer-to-peer network may comprise a Bluetooth network. The indirect data delivery service may be provided by the UE 708, 710, or 712 through a discovery channel embedded in a wireless network. The discovery channel may be associated with one or more of proximal device and service discovery. The wireless network may comprise one or more of a LAN and a WAN. In one example, the wireless network may comprise an LTE network.

At step 804, the UE 702 determines a probable latency time associated with the indirect delivery service. The probable latency time associated with the indirect delivery service maybe calculated based on an expected connection between the UE 708, 710, or 712 and the WiFi network. The probable latency time may correspond to a latest delivery time. The performance optimization criteria may comprise a threshold probability of delivery of one or more data packets within the latest delivery time. Transmitting the data packet to UE 708, 710 or 712 may comprise transmitting the data packet to a plurality of UE 708, 710 and/or 712, each advertising a probability of delivery within the latest delivery time. The data packet is transmitted to the plurality of UE 708, 710 and/or 712 when a combined probability of delivery calculated for the plurality of UE 708, 710 and/or 712 exceeds the threshold probability of delivery.

In some embodiments, the performance optimization criteria comprises a pricing incentive associated with a reduction in channel overhead of a wireless network associated with transmitting the data packet to the packet data network through the UE 708, 710 and/or 712.

At step 806, the UE 702 determines if a characteristic of the advertised delivery service meets on or more performance optimization criteria. The performance optimization criteria may comprise battery life of UE 708, 710 or 712. The performance optimization criteria may comprise network loading criteria. Network loading may relate to wireless network loading. Network loading may relate to packet data network loading.

At step 808, if a characteristic of the data delivery service satisfies the one or more performance criteria, the UE 702 transmits a data packet to UE 708, 710, or 712 for delivery to a packet data network using the indirect delivery service the data packet is transmitted to UE 708, 710, or 712 when the probable latency time allows a delivery deadline associated with the data packet to be satisfied. The probable latency time may be provided in the information advertising availability of the indirect data delivery service that is received from UE 708, 710, or 712. The probable latency time may be based on an expected access by UE 708, 710, or 712 of the packet data network. The probable latency time may be determined based on a statistical analysis of prior accesses by UE 708, 710, or 712 of the packet data network. The statistical analysis may include using one or more utility function.

In some embodiments, the data packet is transmitted to UE 708, 710, or 712 when UE 708, 710, or 712 indicates that one or more other packets are scheduled for transmission to the packet data network. The data packet may be transmitted to UE 708, 710, or 712 when UE 708, 710, or 712 advertises an aggregation service that permits transmission of data packets from a plurality of transmitters through a single connection with the packet data network. In one example, transmission may utilize a nearby mobile device and/or UE's existing WWAN connection for data delivery in order to reduce network control overhead associated with establishing a direct WWAN connection. In some embodiments, the network may indicate the loading of the control plane, and when the control plane is heavily loaded, a UE may be configured to avoid additional loading by not attempting a direct connection, but using a peer device/UE's connection for data delivery. For example, the UE may specify its delay tolerance when it sends data to an alternate device and/or UE, enabling the data to be delivered by the alternate device/UE through an existing data connection within the deadline specified for delivery.

In some embodiments, the data packet is transmitted to UE 708, 710, or 712 when the probable latency time allows a delivery deadline associated with the data packet to be satisfied, and wherein the probable latency time is provided in the information advertising availability of the indirect data delivery service that is received from UE 708, 710, or 712.

The data packet may be transmitted to UE 708, 710, or 712 when UE 708, 710, or 712 advertises access to the packet data network through a wireless network transmitter that operates at lower transmission power than the transmission power of a local wireless network transmitter. The data packet may be transmitted to UE 708, 710, or 712 when UE 708, 710, or 712 advertises access to the packet data network through a wireless network channel that provides higher data throughput than a local wireless network transmitter. The data packet may be transmitted to UE 708, 710, or 712 when UE 708, 710, or 712 advertises access to the packet data network through a wireless network transmitter that has established a higher quality channel to a wireless base station than a corresponding channel of a local wireless network transmitter.

In some embodiments, the data packet is transmitted to UE 708, 710, or 712 when UE 708, 710, or 712 advertises access to the packet data network through a RAN that is different from a locally available RAN. The data packet may be transmitted to the UE 708, 710, or 712 when UE 708, 710, or 712 advertises future access to the packet data network through a RAN that is different from a currently available RAN. The data packet may be transmitted to UE 708, 710, or 712 when UE 708, 710, or 712 advertises access to the packet data network through a WiFi network.

In some embodiments, the data packet is transmitted to UE 708, 710, or 712 for delivery to the packet data network using the indirect delivery service in order to prolong local battery power. The data packet may be transmitted to UE 708, 710, or 712 for delivery to the packet data network at a time when network loading is expected to be lower than current network loading. The data packet may comprise encrypted data. The packet may be one of a plurality of data packets transmitted to the packet data network through a plurality of UEs 708, 710, or 712.

In some embodiments, transmitting the data packet to UE 708, 710, or 712 includes communicating the data packet through a peer-to-peer network. The peer-to-peer network may comprise a discovery channel embedded in a wireless network. The discovery channel may be related to one or more of proximal device and service discovery. The wireless network may comprise one or more of a WAN and a LAN. In some embodiments, the wireless network comprises an LTE network.

In some embodiments, the data packet is transmitted using the indirect delivery service when transmitting through the indirect delivery service reduces channel overhead of a wireless network. The data packet may be transmitted to the UE when the UE indicates that one or more packets from other transmitters are already scheduled for transmission to the packet data network.

In some embodiments, the data packet is transmitted to UE 708, 710, or 712 when UE 708, 710, or 712 advertises an aggregation service that permits transmission of data packets from a plurality of source devices through an established channel. The data packet may be transmitted to UE 708, 710, or 712 when UE 708, 710, or 712 advertises access to the packet data network through a wireless network transmitter that operates at lower transmission power than the transmission power of a local wireless network transmitter.

At step 810, if a characteristic of the data delivery service does not satisfy the one or more performance criteria, the UE 702 may directly deliver the data packet to the packet data network.

Figure 9:
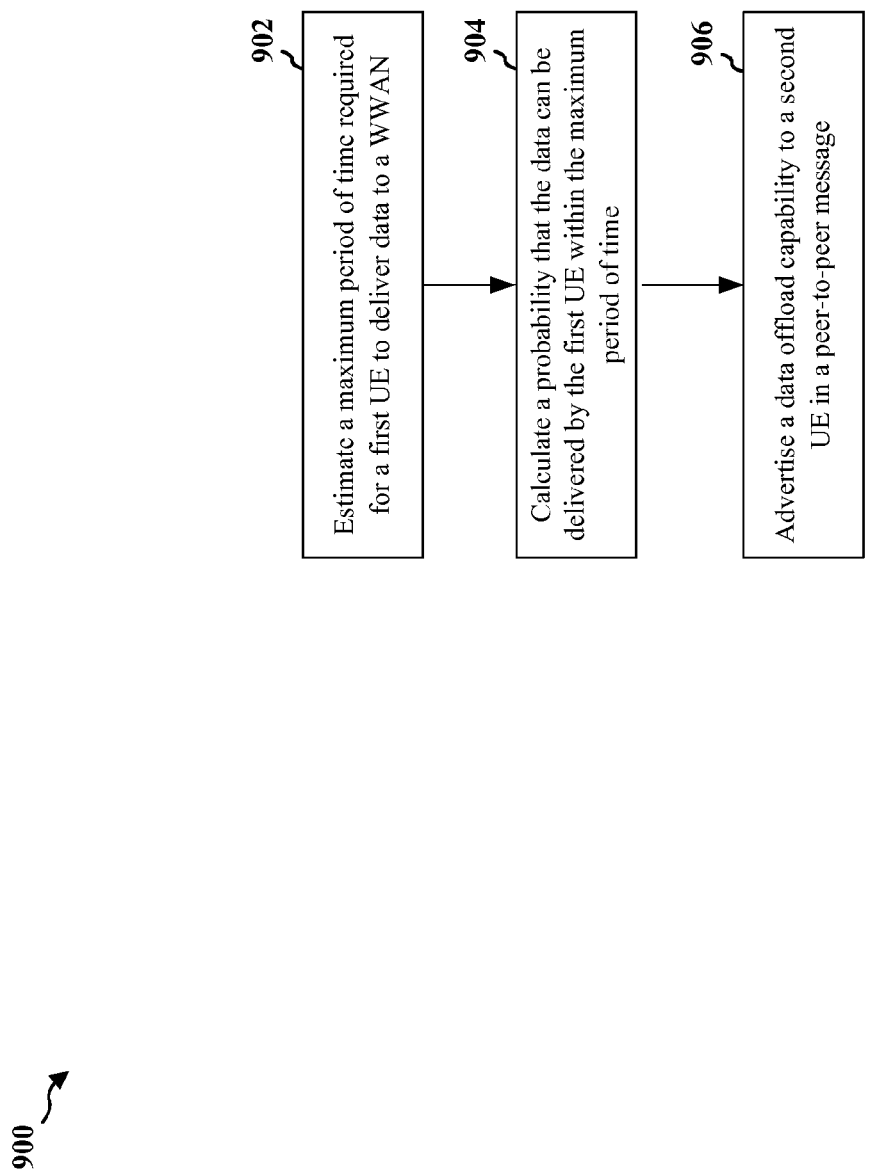
FIG. 9 is a flow chart of a method of wireless communication.

FIG. 9 is a flow chart 900 of a method of wireless communication. The method may be performed by a UE 708, 710, or 712. At step 902 the UE 708, 710, or 712 estimates a maximum period of time required for a first UE 708, 710, or 712 to deliver data to a WWAN.

At step 904, UE 708, 710, or 712 calculates a probability that the data can be delivered by the first UE 708, 710, or 712 within the maximum period of time. The probability may be based on likelihood that a connection between the UE 708, 710, or 712 can be sustained or established within the maximum period of time. The maximum period of time and/or the probability may be determined based on a statistical analysis of prior connections between the first UE 708, 710, or 712 and the WWAN.

At step 906, the UE 708, 710, or 712 advertises a data offload capability to a second UE 702 in a peer-to-peer message that includes information quantifying the maximum period of time and the probability. Advertising the data offload capability to the second UE 702 may include broadcasting the peer-to-peer message to a plurality of UEs 702, 708, 710, and/or 712. Data may be received from the plurality of UEs 702, 708, 710, and/or 712 in response to the advertised capability. The peer-to-peer message may be transmitted when the second UE 702 has a superior connection to the WWAN, and the second UE 702 may nonetheless elect to use the advertised services because the at least one of the maximum period of time and the probability relates to an expected future connection.

In some embodiments, the UE 708, 710, or 712 receives the data from the second UE 702 in response to the peer-to-peer message and transmits the data from before the maximum period of time has expired. The data may be transmitted from the first UE 708, 710, or 712 to a third UE 708, 710, or 712 in response to a peer-to-peer message advertising a data offload capability of the third UE 708, 710, or 712. The data may alternatively be transmitted from the first UE 708, 710, or 712 to the WWAN.

In some embodiments, the one or more of UEs 702, 708, 710, or 712 is in motion, and may be traveling in a general direction that may bring UE 702, 708, 710, or 712 into contact with one or more RANs, and wherein at least one of the maximum period of time and the probability is determined based on previous travels of UE 702, 708, 710, or 712.

Figure 10:
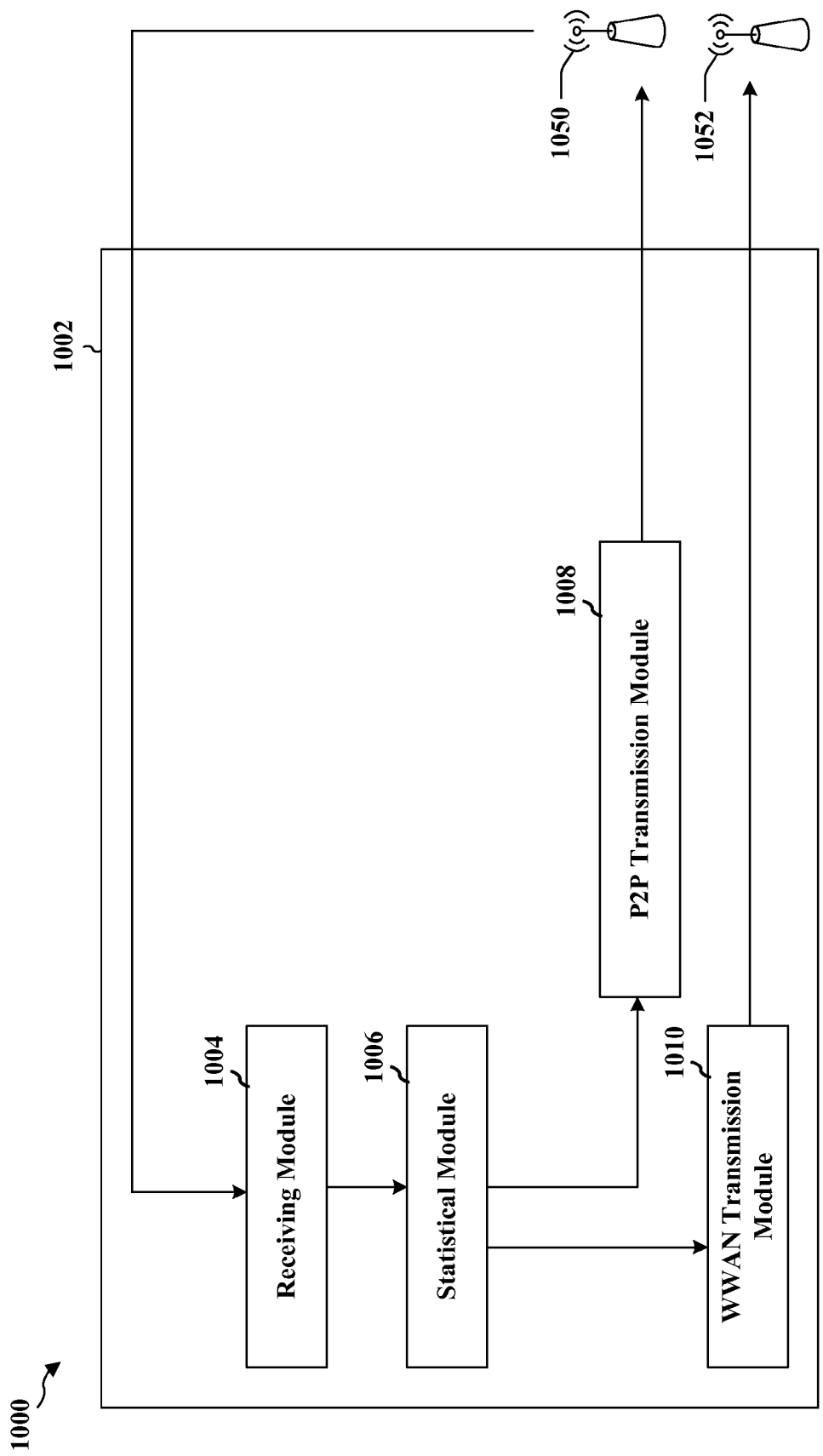
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE 702, 708, 710, or 712. The apparatus includes a module 1004 that receives P2P communications, a module 1006 that calculates statistics, including probabilities, latencies, estimated delays, etc. associated with current and expected network connections, a module 1008 that transmits to peer devices, and a module 1010 that communicates directly with a WWAN. P2P network may comprise a Bluetooth, WiFi or other network. WWAN may be implemented as an LTE, CDMA or other wireless network.

The apparatus may include additional modules that perform each of the steps of the algorithm in the aforementioned flow charts of FIGS. 8 and 9. As such, each step in the aforementioned flow charts of FIGS. 8 and 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
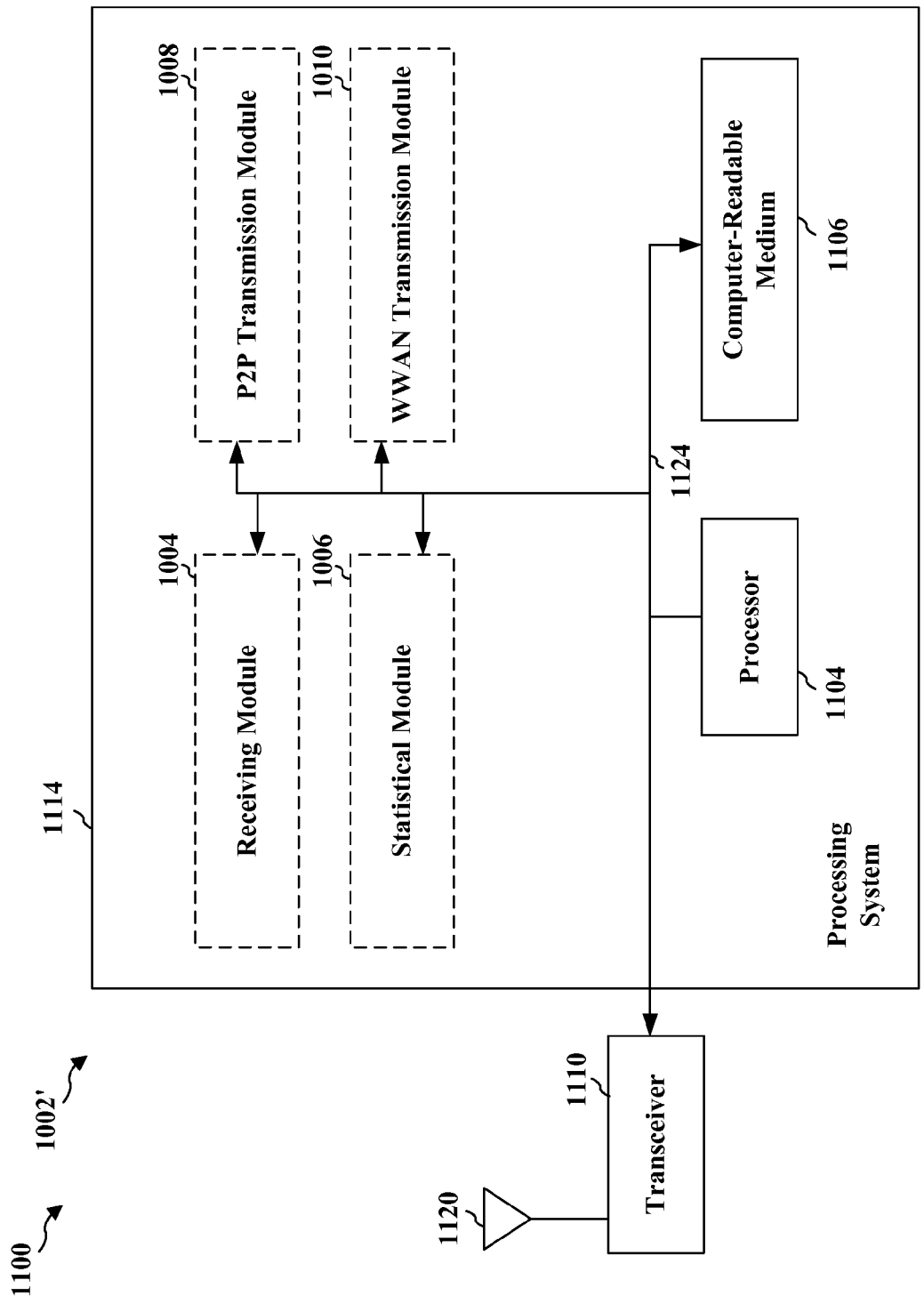
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least one of the modules 1004, 1006, 1008, and 1010. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 6510.

In one configuration, the apparatus 1002/1002' for wireless communication includes receiving means 1004 for receiving information from a UE 708, 710, and/or 712 advertising availability of an indirect data delivery service provided by the UE 708, 710, and/or 712, statistical means 1006 for determining a probable latency time associated with the indirect delivery service, P2P transmission means 1008 for transmitting a data packet to the UE 708, 710, and/or 712 for delivery to a packet data network using the indirect delivery service, and WWAN transmission means 1010 for delivering the data packet directly to the packet data.

In another configuration, the apparatus 1002/1002' for wireless communication includes statistical means 1006 for estimating a maximum period of time required for UE 708, 710, and/or 712 to deliver data to a WWAN and/or for calculating a probability that the data can be delivered by the UE 708, 710, and/or 712 within a maximum period of time, PSP transmission means 1008 for transmitting advertising a data offload capability, receiving means 1004 for receiving data over a P2P connection, and WWLAN transmission means 1008 for transmitting the data to the WWLAN.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 668, the RX Processor 656, and the controller/processor 6510. As such, in one configuration, the aforementioned means may be the TX Processor 668, the RX Processor 656, and the controller/processor 6510 configured to perform the functions recited by the aforementioned means.

Further Disclosure is Included in the Appendix.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving information from a plurality of proximate user equipments (UEs) advertising availability of an indirect data delivery service provided by the plurality of UEs;
   determining a probable latency time associated with the indirect delivery service;
   receiving, from each of the plurality of UEs, a probability of delivery within the probable latency time;
   transmitting a data packet to the plurality of UEs for delivery to a packet data network using the indirect delivery service when a characteristic of the indirect data delivery service satisfies one or more performance optimization criteria, wherein the one or more performance optimization criteria comprise a threshold probability of delivery of one or more data packets within the probable latency time, wherein the one or more performance optimization criteria is satisfied when a combined probability of delivery calculated for the plurality of UEs exceeds the threshold probability of delivery; and
   directly delivering the data packet to the packet data network when the characteristic of the indirect data delivery service does not satisfy the one or more performance optimization criteria.

2. The method of claim 1, wherein the data packet is transmitted to the plurality of UEs when the probable latency time allows a delivery deadline associated with the data packet to be satisfied.

3. The method of claim 2, wherein the probable latency time is provided in the information advertising availability of the indirect data delivery service that is received from the plurality of UEs.

4. The method of claim 2, wherein the probable latency time is further based on an expected access by the plurality of UEs of the packet data network.

5. The method of claim 4, wherein the probable latency time is determined further based on a statistical analysis of prior accesses by the plurality of UEs of the packet data network.

6. The method of claim 1, wherein the data packet is transmitted using the indirect delivery service when transmitting through the indirect delivery service reduces channel overhead of a wireless network.

7. The method of claim 6, wherein the data packet is transmitted to the plurality of UEs when the plurality of UEs indicates that one or more packets from other transmitters are already scheduled for transmission to the packet data network.

8. The method of claim 6, wherein the data packet is transmitted to the plurality of UEs when the plurality of UEs advertises an aggregation service that permits transmission of data packets from a plurality of source devices through an established channel.

9. The method of claim 1, wherein the data packet is transmitted to the plurality of UEs when the plurality of UEs advertises access to the packet data network through a wireless network transmitter that operates at lower transmission power than the transmission power of a local wireless network transmitter.

10. The method of claim 1, wherein the data packet is transmitted to the plurality of UEs when the plurality of UEs advertises access to the packet data network through a wireless network channel that provides higher data throughput or lower channel cost than a collocated transmitter.

11. The method of claim 1, wherein the data packet is transmitted to the plurality of UEs when the plurality of UEs advertises access to the packet data network through a wireless network transmitter that has established a higher quality channel to a wireless base station than a corresponding channel of a local wireless network transmitter.

12. The method of claim 1, wherein the data packet is transmitted to the plurality of UEs when the plurality of UEs advertises access to the packet data network through a radio access network (RAN) that is different from a locally available RAN.

13. The method of claim 1, wherein the data packet is transmitted to the plurality of UEs when the plurality of UEs advertises future access to the packet data network through a RAN that is different from a currently available RAN.

14. The method of claim 1, wherein the data packet is transmitted to the plurality of UEs when the plurality of UEs advertises access to the packet data network through a WiFi network, wherein the probable latency time associated with the indirect delivery service is calculated based on an expected connection between the plurality of UEs and the WiFi network.

15. The method of claim 1, wherein the probable latency time corresponds to a latest delivery time.

16. The method of claim 1, wherein the data packet is one of a plurality of data packets transmitted to the packet data network through the plurality of UEs.

17. The method of claim 1, wherein the one or more performance optimization criteria comprises battery life, and wherein the data packet is transmitted to the plurality of UEs for delivery to the packet data network using the indirect delivery service in order to prolong local battery power.

18. The method of claim 1, wherein the one or more performance optimization criteria comprises network loading criteria, and wherein the data packet is transmitted to the plurality of UEs for delivery to the packet data network at a time when network loading is expected to be lower than current network loading.

19. The method of claim 1, further comprising transmitting one or more data packets received from at least one of the plurality of UEs to the packet data network.

20. The method of claim 1, wherein the information advertising availability of the indirect data delivery service is provided by the plurality of UEs through a peer-to-peer network.

21. The method of claim 20, wherein the peer-to-peer network comprises a Bluetooth network or a long term evolution (LTE) network.

22. The method of claim 20, wherein the peer-to-peer network comprises a discovery channel embedded in a wireless network.

23. The method of claim 1, wherein transmitting the data packet to the plurality of UEs includes communicating the data packet through a device-to-device communication channel embedded in a wireless network.

24. The method of claim 23, wherein the wireless network comprises an LTE network.

25. The method of claim 1, wherein the data packet comprises encrypted data.

26. The method of claim 1, wherein the performance optimization criteria comprises a pricing incentive associated with a reduction in channel overhead of a wireless network associated with transmitting the data packet to the packet data network through the plurality of UEs.

27. An apparatus for wireless communication, comprising:
means for receiving information from a plurality of nearby user equipments (UEs) advertising availability of an indirect data delivery service provided by the plurality of UEs;
means for determining a probable latency time associated with the indirect delivery service;
means for receiving, from each of the plurality of UEs, a probability of delivery within the probable latency time;
means for transmitting a data packet to the plurality of UEs for delivery to a packet data network using the indirect delivery service when a characteristic of the indirect data delivery service satisfies one or more performance optimization criteria, wherein the one or more performance optimization criteria comprise a threshold probability of delivery of one or more data packets within the probable latency time, wherein the one or more performance optimization criteria is satisfied when a combined probability of delivery calculated for the plurality of UEs exceeds the threshold probability of delivery; and
means for delivering the data packet directly to the packet data network when the characteristic of the indirect data delivery service does not satisfy the one or more performance optimization criteria.

28. The apparatus of claim 27, wherein the means for transmitting the data packet transmits the data packet to the plurality of UEs when the probable latency time allows a delivery deadline associated with the data packet to be satisfied.

29. The apparatus of claim 28, wherein the probable latency time is provided in the information advertising availability of the indirect data delivery service that is received from the plurality of UEs.

30. The apparatus of claim 29, wherein the probable latency time is further based on an expected access by the plurality of UEs of the packet data network.

31. The apparatus of claim 30, wherein the probable latency time is determined further based on a statistical analysis of prior accesses by the plurality of UEs of the packet data network.

32. The apparatus of claim 27, wherein the means for transmitting the data packet transmits the data packet using the indirect delivery service when transmitting through the indirect delivery service reduces channel overhead of a wireless network.

33. The apparatus of claim 32, wherein the means for transmitting the data packet transmits the data packet to the plurality of UEs when the plurality of UEs indicates that one or more packets from other transmitters are already scheduled for transmission to the packet data network.

34. The apparatus of claim 33, wherein the means for transmitting the data packet transmits the data packet to the plurality of UEs when the plurality of UEs advertises an aggregation service that permits transmission of data packets from a plurality of source devices through an established channel.

35. The apparatus of claim 27, wherein the means for transmitting the data packet transmits the data packet to the plurality of UEs when the plurality of UEs advertises access to the packet data network through a wireless network transmitter that operates at lower transmission power than the transmission power of a local wireless network transmitter.

36. The apparatus of claim 27, wherein the means for transmitting the data packet transmits the data packet to the plurality of UEs when the plurality of UEs advertises access to the packet data network through a wireless network channel that provides higher data throughput or lower channel cost than a collocated transmitter.

37. The apparatus of claim 27, wherein the means for transmitting the data packet transmits the data packet to the plurality of UEs when the plurality of UEs advertises access to the packet data network through a wireless network transmitter that has established a higher quality channel to a wireless base station than a corresponding channel of a local wireless network transmitter.

38. The apparatus of claim 27, wherein the means for transmitting the data packet transmits the data packet to the plurality of UEs when the plurality of UEs advertises access to the packet data network through a radio access network (RAN) that is different from a locally available RAN.

39. The apparatus of claim 27, wherein the means for transmitting the data packet transmits the data packet to the plurality of UEs when the plurality of UEs advertises future access to the packet data network through a RAN that is different from a currently available RAN.

40. The apparatus of claim 27, wherein the means for transmitting the data packet transmits the data packet to the plurality of UEs when the plurality of UEs advertises access to the packet data network through a WiFi network, wherein the probable latency time associated with the indirect delivery service is calculated based on an expected connection between the plurality of UEs and the WiFi network.

41. The apparatus of claim 27, wherein the probable latency time corresponds to a latest delivery time.

42. The apparatus of claim 27, wherein the data packet is one of a plurality of data packets transmitted to the packet data network through the plurality of UEs.

43. The apparatus of claim 27, wherein the one or more performance optimization criteria comprises battery life, and wherein the data packet is transmitted to the plurality of UEs for delivery to the packet data network using the indirect delivery service in order to prolong local battery power.

44. The apparatus of claim 27, wherein the one or more performance optimization criteria comprises network loading criteria, and wherein the data packet is transmitted to the plurality of UEs for delivery to the packet data network at a time when network loading is expected to be lower than current network loading.

45. The apparatus of claim 27, further comprising means for transmitting one or more data packets received from at least one of the plurality of UEs to the packet data network.

46. The apparatus of claim 27, wherein the information advertising availability of the indirect data delivery service is provided by the plurality of UEs through a peer-to-peer network.

47. The apparatus of claim 46, wherein the peer-to-peer network comprises a Bluetooth network or a long term evolution (LTE) network.

48. The apparatus of claim 46, wherein the peer-to-peer network comprises a discovery channel embedded in a wireless network.

49. The apparatus of claim 27, wherein the means for transmitting the data packet to the plurality of UEs utilizes a device-to-device communication channel embedded in a wireless network.

50. The apparatus of claim 49, wherein the wireless network comprises an LTE network.

51. The apparatus of claim 27, wherein the data packet comprises encrypted data.

52. The apparatus of claim 27, wherein the performance optimization criteria comprises a pricing incentive associated with a reduction in channel overhead of a wireless network associated with transmitting the data packet to the packet data network through the plurality of UEs.

53. An apparatus for wireless communication, comprising:
a memory; and
at least one processor coupled to the memory and configured to:
receive information from a plurality of proximate user equipments (UEs) advertising availability of an indirect data delivery service provided by the plurality of UEs;
determine a probable latency time associated with the indirect delivery service;
receive, from each of the plurality of UEs, a probability of delivery within the probable latency time;
transmit a data packet to the plurality of UEs for delivery to a packet data network using the indirect delivery service when a characteristic of the indirect data delivery service satisfies one or more performance optimization criteria, wherein the one or more performance optimization criteria comprise a threshold probability of delivery of one or more data packets within the probable latency time, wherein the one or more performance optimization criteria is satisfied when a combined probability of delivery calculated for the plurality of UEs exceeds the threshold probability of delivery; and
directly deliver the data packet to the packet network when the characteristic of the indirect data delivery service does not satisfy the one or more performance optimization criteria.

54. A computer program product, comprising:
a non-transitory computer-readable medium comprising code for:
receiving information from a plurality of proximate user equipments (UEs) advertising availability of an indirect data delivery service provided by the plurality of UEs;
determining a probable latency time associated with the indirect delivery service;
receiving, from each of the plurality of UEs, a probability of delivery within the probable latency time;
transmitting a data packet to the plurality of UEs for delivery to a packet data network using the indirect delivery service when a characteristic of the indirect data delivery service satisfies one or more performance optimization criteria, wherein the one or more performance optimization criteria comprise a threshold probability of delivery of one or more data packets within the probable latency time, wherein the one or more performance optimization criteria is satisfied when a combined probability of delivery calculated for the plurality of UEs exceeds the threshold probability of delivery; and
directly delivering the data packet to the packet data network when the characteristic of the indirect data delivery service does not satisfy the one or more performance optimization criteria.

55. The apparatus of claim 53, wherein the data packet is transmitted to the plurality of UEs when the probable latency time allows a delivery deadline associated with the data packet to be satisfied.

56. The apparatus of claim 55, wherein the probable latency time is provided in the information advertising availability of the indirect data delivery service that is received from the plurality of UEs.

57. The apparatus of claim 55, wherein the probable latency time is further based on an expected access by the plurality of UEs of the packet data network.

58. The apparatus of claim 57, wherein the probable latency time is determined further based on a statistical analysis of prior accesses by the plurality of UEs of the packet data network.

59. The apparatus of claim 53, wherein the data packet is transmitted using the indirect delivery service when transmitting through the indirect delivery service reduces channel overhead of a wireless network.

60. The apparatus of claim 59, wherein the data packet is transmitted to the plurality of UEs when the plurality of UEs indicates that one or more packets from other transmitters are already scheduled for transmission to the packet data network.

61. The apparatus of claim 59, wherein the data packet is transmitted to the plurality of UEs when the plurality of UEs advertises an aggregation service that permits transmission of data packets from a plurality of source devices through an established channel.

62. The apparatus of claim 53, wherein the data packet is transmitted to the plurality of UEs when the plurality of UEs advertises access to the packet data network through a wireless network transmitter that operates at lower transmission power than the transmission power of a local wireless network transmitter.

63. The apparatus of claim 53, wherein the data packet is transmitted to the plurality of UEs when the plurality of UEs advertises access to the packet data network through a wireless network channel that provides higher data throughput or lower channel cost than a collocated transmitter.

64. The apparatus of claim 53, wherein the data packet is transmitted to the plurality of UEs when the plurality of UEs advertises access to the packet data network through a wireless network transmitter that has established a higher quality channel to a wireless base station than a corresponding channel of a local wireless network transmitter.

65. The apparatus of claim 53, wherein the data packet is transmitted to the plurality of UEs when the plurality of UEs advertises access to the packet data network through a radio access network (RAN) that is different from a locally available RAN.

66. The apparatus of claim 53, wherein the data packet is transmitted to the plurality of UEs when the plurality of UEs advertises future access to the packet data network through a RAN that is different from a currently available RAN.

67. The apparatus of claim 53, wherein the data packet is transmitted to the plurality of UEs when the plurality of UEs advertises access to the packet data network through a WiFi network, wherein the probable latency time associated with the indirect delivery service is calculated based on an expected connection between the plurality of UEs and the WiFi network.

68. The apparatus of claim 53, wherein the probable latency time corresponds to a latest delivery time.

69. The apparatus of claim 53, wherein the one or more performance optimization criteria comprises battery life, and wherein the data packet is transmitted to the plurality of UEs for delivery to the packet data network using the indirect delivery service in order to prolong local battery power.

70. The apparatus of claim 53, wherein the one or more performance optimization criteria comprises network loading criteria, and wherein the data packet is transmitted to the plurality of UEs for delivery to the packet data network at a time when network loading is expected to be lower than current network loading.

71. The apparatus of claim 53, wherein the information advertising availability of the indirect data delivery service is provided by the plurality of UEs through a peer-to-peer network.

72. The apparatus of claim 71, wherein the peer-to-peer network comprises a Bluetooth network or a long term evolution (LTE) network.

73. The apparatus of claim 71, wherein the peer-to-peer network comprises a discovery channel embedded in a wireless network.

74. The apparatus of claim 53, wherein, to transmit the data packet to the plurality of UEs, the at least one processor is configured to communicate the data packet through a device-to-device communication channel embedded in a wireless network, wherein the wireless network comprises an LTE network.

75. The apparatus of claim 53, wherein the performance optimization criteria comprises a pricing incentive associated with a reduction in channel overhead of a wireless network associated with transmitting the data packet to the packet data network through the plurality of UEs.

* * * * *